(12) United States Patent
Patterson

(10) Patent No.: US 7,798,098 B1
(45) Date of Patent: Sep. 21, 2010

(54) ANIMAL FEEDER

(76) Inventor: Shawn C. Patterson, 1220 Fort Worth Hwy., Weatherford, TX (US) 76086

( * ) Notice: Subject to any disclaimer, the term of this patent is extended or adjusted under 35 U.S.C. 154(b) by 0 days.

(21) Appl. No.: 11/860,197

(22) Filed: Sep. 24, 2007

(51) Int. Cl.
*A01K 5/02* (2006.01)
(52) U.S. Cl. ...................... 119/51.11; 119/53
(58) Field of Classification Search ........................ None
See application file for complete search history.

(56) References Cited

U.S. PATENT DOCUMENTS

| | | | |
|---|---|---|---|
| 259,252 A | 6/1882 | Wessells | |
| 1,440,875 A * | 1/1923 | Howard | 119/51.01 |
| 2,808,029 A * | 10/1957 | Geerlings | 119/53.5 |
| 3,195,508 A | 7/1965 | Lehman et al. | |
| 3,730,142 A * | 5/1973 | Kahrs et al. | 119/54 |
| 4,538,548 A | 9/1985 | Page | |
| 4,967,697 A * | 11/1990 | Lau | 119/51.04 |
| 4,986,220 A | 1/1991 | Reneau et al. | |
| 5,069,164 A | 12/1991 | Wiwi | |
| 5,195,458 A | 3/1993 | Black et al. | |
| 5,259,337 A | 11/1993 | Rasmussen | |
| 5,463,980 A | 11/1995 | Rasmussen | |
| 5,497,730 A * | 3/1996 | van Daele et al. | 119/53 |
| 5,794,561 A | 8/1998 | Schulz | |
| 6,082,300 A * | 7/2000 | Futch | 119/51.11 |
| 6,199,511 B1 * | 3/2001 | Thibault | 119/53 |
| 6,363,887 B1 | 4/2002 | Davis | |
| 6,481,374 B1 | 11/2002 | Lillig | |
| 6,532,895 B1 * | 3/2003 | Andersen | 119/57.4 |
| 6,789,503 B1 * | 9/2004 | Gao | 119/51.11 |
| 7,222,583 B2 * | 5/2007 | Foster et al. | 119/57.91 |
| 2003/0005887 A1 | 1/2003 | Graham | |
| 2005/0284385 A1 | 12/2005 | Quinn | |

* cited by examiner

*Primary Examiner*—Michael R Mansen
*Assistant Examiner*—Brian M O'Hara
(74) *Attorney, Agent, or Firm*—Geoffrey A. Mantooth; Brian K. Yost

(57) ABSTRACT

The animal feeder has an elevated container, a food distributor and a collector around the distributor. Feed placed in the container exits through the container lower opening and falls onto the distributor spinner plate. When activated, the spinner plate throws the feed into a bin of the collector. The feed falls from the collector bin into a conduit, where it travels to a trough. The collector is removably coupled to the feeder to allow the feeder to dispense feed either on the ground (without the collector) or into the collector trough. The length of the conduit is adjustable to allow the trough to bear on the ground. The collector bin is provided with a transparent hatch to allow access to the distributor.

9 Claims, 3 Drawing Sheets

ANIMAL FEEDER

BACKGROUND OF THE INVENTION

1. Field of the Invention

The present invention relates to an animal feeder.

2. Description of the Prior Art

Animal feeders have become increasingly popular and are used for a variety of purposes. For example, some feeders are used to feed large domestic livestock such as horses and cattle and smaller animals such as dogs and cats. Others are used to attract wildlife for viewing, photographing, or hunting and may be used to supplement the diets of various wildlife species. The feed distributed by feeders also varies, and includes corn and grain as well as specialized pellets providing protein, calcium, phosphorus, fat and other important nutrients.

The size and shape of feeders vary with the application. One type of feeder is comprised of a container or drum supported by legs or suspended from a tree or beam, and a distributor that regulates feed distribution. The distributors often have automatic timers allowing the user to distribute feed at predetermined intervals for specified periods of time. Sophisticated timers may be programmed to spread feed many times per day or week. For example, a photographer who desires to distribute feed for four seconds every morning at 6:00 a.m. may do so by making a simple adjustment to the timer settings. Most feeders have a distribution mechanism, or spinner, that throws the feed in a 360° radius. Thus, feed may be spread over a relatively large area in relation to the feeder.

Unfortunately, much of the feed spread by conventional animal feeders is wasted. Some waste results from lack of animal activity. In this case, the feed simply rests on the ground for extended periods of time until the animal no longer finds it desirable. Other waste results from moisture. Such moisture, often in the form of rain, causes the distributed feed to dissolve, so that the feed is either unavailable or considered undesirable by the animal. Pellets in particular are susceptible to moisture, such as dew. Once exposed to moisture, the pellet disintegrates and becomes unpalatable.

What is needed is a feeder capable of distributing a variety of feeds to a confined area to limit feed waste and protect feed from damage caused by the elements.

SUMMARY OF THE INVENTION

The present invention provides an animal feeder comprising a container, a food distributor and a collector. The container has an interior that is structured and arranged to receive animal feed. The container is elevated above ground. The food distributor is adjacent to an exterior of the container and communicates with the container interior. The distributor is structured and arranged to dispense food from the container exteriorly of the container. The collector is removably coupled to the container and at least partially surrounds the distributor so as to collect the food dispensed by the distributor. The collector comprises a bin, a conduit and a trough.

In one aspect of the present invention, the conduit has an adjustable length between the bin and trough.

In accordance with another aspect of the present invention, the conduit is telescoping.

In accordance with another aspect of the present invention, the bin has a access hatch.

In accordance with another aspect of the present invention, the hatch is transparent.

In accordance with another aspect of the present invention, a portion of the bin is transparent.

In accordance with another aspect of the present invention, a canopy is located on the conduit above the trough. The canopy serves to protect the feed in the trough from weather.

BRIEF DESCRIPTION OF THE DRAWINGS

FIG. 3b is a cross-sectional detail view of the coupling of the first and second containers with the barrel clamp of FIG. 3a.

DESCRIPTION OF THE PREFERRED EMBODIMENT

Figure 1:
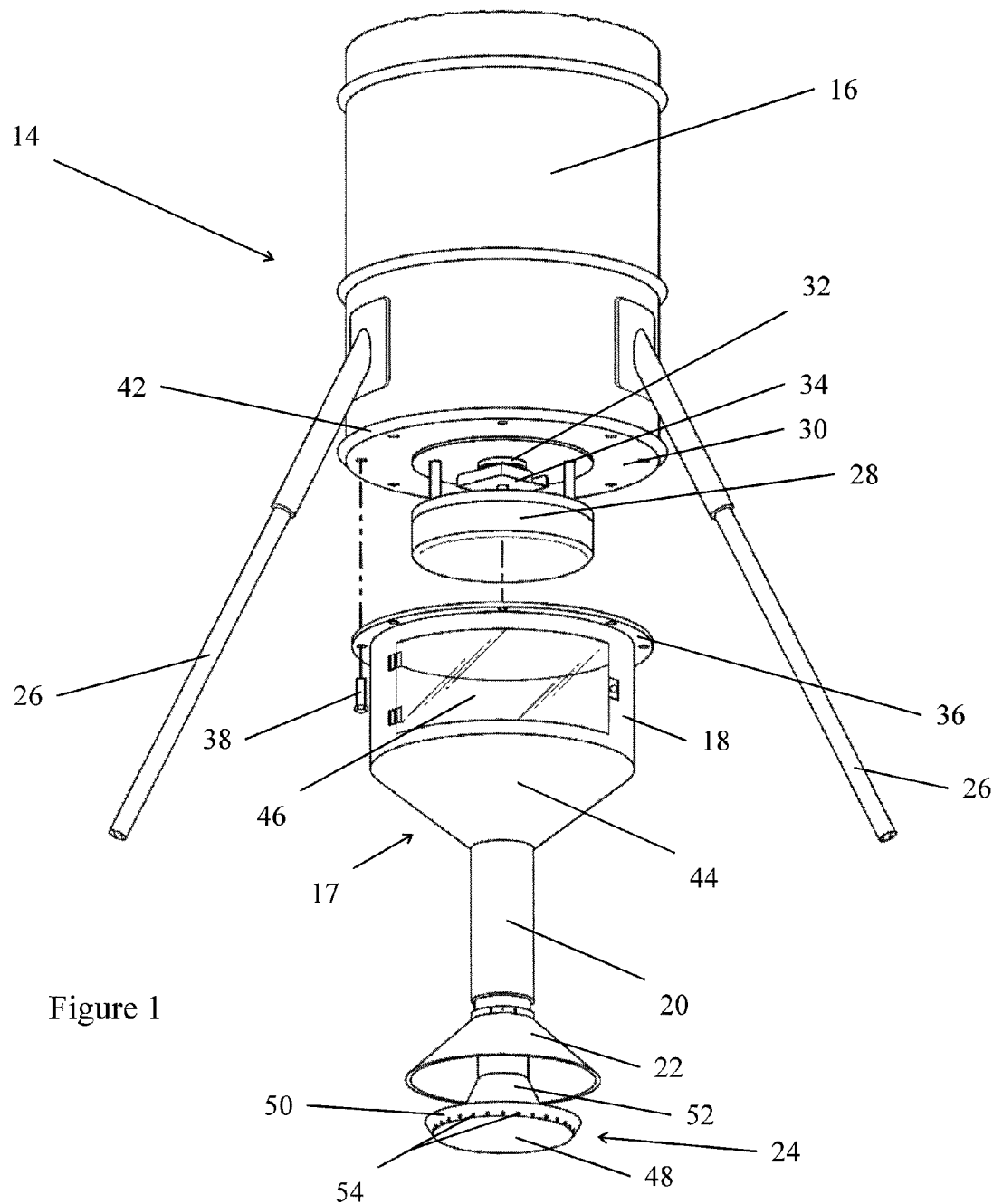
FIG. 1 is an isometric exploded view of the animal feeder of the present invention, in accordance with a preferred embodiment.

Referring to FIG. 1, the animal feeder 14 of the preferred embodiment is comprised of a first container or barrel 16 and a collector 17. The collector 17 includes a bin 18, a conduit 20, and a trough 24. Generally, the barrel 16 is elevated above the ground by legs 26 and contains a quantity of animal feed. A food distributor 28 is coupled to the barrel 16 and serves to disperse the food onto the ground. The collector 17 retrofits onto existing feeders and captures the food dispersed by the dispenser. The collector 17 delivers the dispensed food into the trough 24, which keeps the food dry and palatable for animals. Thus, the feeder 14 can be equipped with the collector 17 to dispense dry food such as pellets. Such a configuration is useful where the food is susceptible to moisture damage (such as pellets) or during wet seasons. In dry seasons, or with food that is not as susceptible to moisture, such as corn, the feeder 14 need not be equipped with the collector.

The barrel 16 is a conventional and commercially available barrel and is the initial receptacle for the feed. The barrel 16 is elevated above the ground. In the preferred embodiment, the barrel 16 has three legs 26 so as to form a tripod. Although the barrel 16 is elevated by three legs 26 in the preferred embodiment, the barrel 16 can be elevated in other ways. For example, the barrel 16 may be elevated by four of more legs 26. In still another embodiment of the invention, the barrel 16 may be suspended from a beam or tree branch. The barrel 16 has an upper opening and a lower opening 32. The lower opening 32 is in the base 30 of the barrel.

In the preferred embodiment, feed is loaded through the upper opening in the barrel 16. The feed exits the barrel 16 through the lower opening 32. A conventional and commercially available distributor 28 is coupled to the barrel 16 below the lower opening 32 of the barrel 16. The distributor 28 has a distribution mechanism or spinner plate 34. The feed exiting the barrel 16 lower opening 32 rests atop the spinner plate 34 until such time as the spinner is activated. Once activated, the spinner plate 34 rotates and throws the feed in a 360° radius. A motor rotates the spinner plate. The motor is powered by a battery. Some distributors may be solar powered. The distributor 28 has a timer that can be programmed so as to operate once or several times per day for a desired duration. For example, the timer may be programmed to operate every morning at 6:00 am for 10 seconds.

Figure 4:
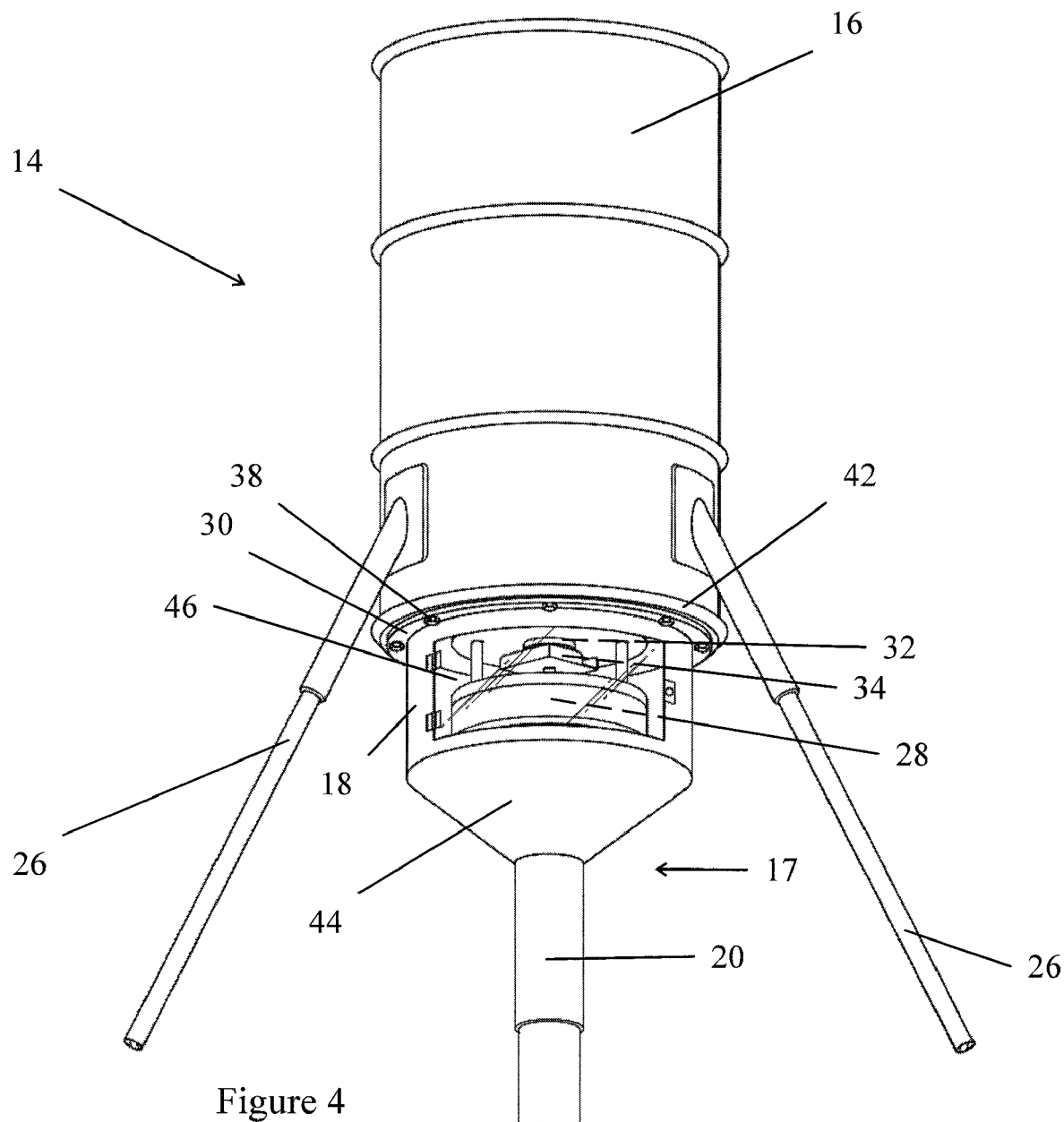
FIG. 4 is an isometric assembled view of the animal feeder of FIG. 1.

Referring to FIGS. 1 and 4, attached to the base 30 of the barrel 16 is the collector 17. The collector 17 includes the bin 18, the conduit 20 and the trough 24. The bin 18 has upper and lower openings, and a side wall. When the bin 18 is attached to the barrel 16, the side wall of the bin 18 at least partially encloses the distributor 28. In this position, the spinner plate 34 can rotate freely and the side wall of the bin 18 deflects feed thrown from the spinner plate 34 down into a hopper 44 that communicates with the conduit 20.

Figure 2:
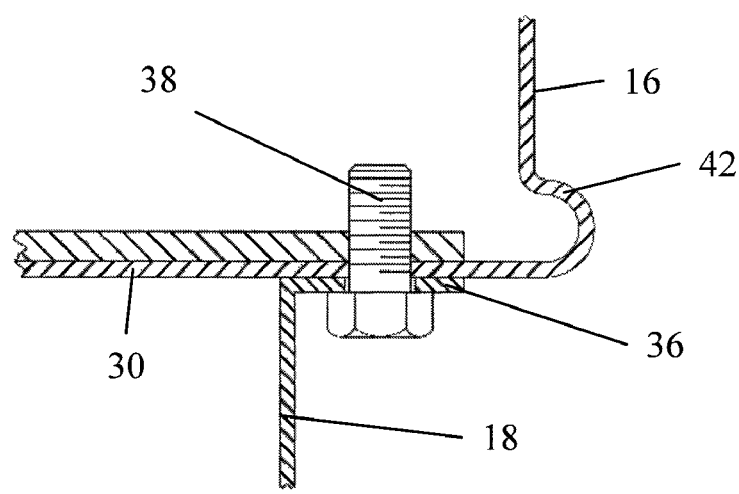
FIG. 2 is a cross-sectional detail view showing the coupling of the first and second containers in accordance with one embodiment of the invention.
Figure 3A:
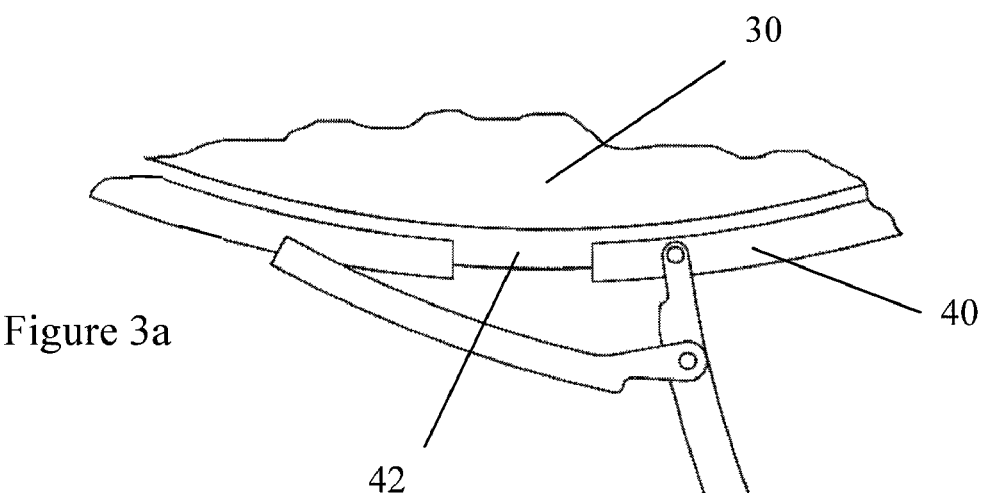
FIG. 3a is a bottom detail view of a barrel clamp used in another embodiment of the invention to couple the first and second containers.
Figure 3B:
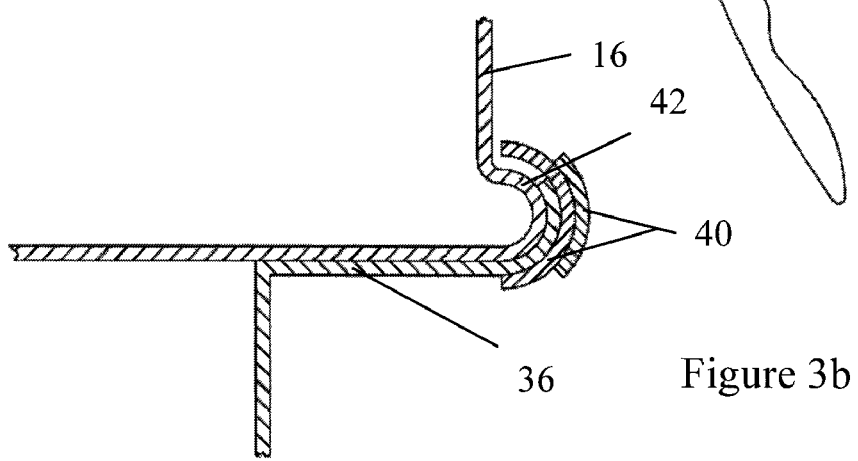

Referring to FIGS. 1 and 2, in the preferred embodiment, the upper edge of the bin 18 has a flange 36. The flange 36, together with the bin 18, is attached to the base 30 of the barrel 16 by suitable retaining devices such as self tapping screws 38. Although the bin 18 of the preferred embodiment is coupled with screws 38, as shown in FIGS. 2 and 4, the bin 18 may be attached in other ways. For example, referring to FIGS. 3a and 3b, in another embodiment of the invention, the bin 18 is attached with a barrel clamp 40. In this embodiment, the flange 36 has a roll to fit adjacent to the lower barrel bead 42 circumscribing the lower rim of the barrel 16. A conventional and commercially available barrel clamp 40 secures the bead 42 to the flange 36, thus, suspending the bin 18 from the barrel 16.

The feed thrown from the spinner plate 34 is deflected by the bin 18 side wall downward to the lower opening of the bin 18. As may be seen in FIGS. 1 and 4, in the preferred embodiment the lower portion, or hopper 44, of the bin 18 slopes inward such that feed entering the bin 18 is funneled downward toward the bin 18 lower opening. The bin 18 side wall of the preferred embodiment has a hatch with a door 46 allowing access to the distributor. The door 46 in the preferred embodiment is transparent, however, the door 46 need not be clear.

Below the bin 18 is the conduit 20. In the preferred embodiment, the conduit 20 is a cylindrical tube. The conduit 20 of the preferred embodiment telescopes so that its length may be adjusted from shorter (FIG. 1) to longer (FIG. 4).

Attached to the bottom end of the conduit 20 is a trough 24. The trough 24 includes a bottom wall 48 which merges with an upwardly extending side wall 50. The bottom wall 48 of the trough 24 of the preferred embodiment is flat and circular and the side wall 50 flares outward. In the approximate center of the trough 24 of the preferred embodiment, there is a central portion 52, with sloped walls extending from the bottom wall 48 upward towards a central vertex, forming an inverted cone. The apex of this central portion 52 extends into the lower opening of the conduit 20. The trough 24 and conduit 20 are coupled such that feed may fall from the conduit 20 lower opening into the trough 24. The flared side wall 50 of the trough of the preferred embodiment has a plurality of perforations 54 which allows moisture to drain from the trough 24.

The trough 24 need not be circular and can be provided in other configurations, such as radially extending rectangular troughs.

As seen in FIGS. 1 and 4, above the trough 24 and coupled to the conduit 20 is a canopy or rain shield 22. This shield 22 protects the trough 24 from rain or other precipitation. The rain shield 22 of the preferred embodiment extends radially from the conduit 20 and has a diameter larger than the trough 24. In the preferred embodiment, the shield is 16-24 inches above the trough or pan 24.

The operation and use of the animal feeder 14 of the preferred embodiment will now be described. The timing mechanism located within the distributor 28 is adjusted for a desired feeding time and duration. Feed is placed in the barrel 16 through the barrel 16 upper opening. The barrel 16 top, or cover, is replaced. The feed settles at the bottom of the barrel 16 and a portion of the feed exits the barrel 16 through the barrel 16 lower opening 32. This exiting feed rests on the spinner plate 34 which prevents the flow of feed from the barrel 16 except upon activation of the spinner plate 34. Upon activation, the spinner plate 34 rotates for the predetermined length of time and feed on the spinner plate 34 is thrown in a 360° radius. As the spinner plate 34 rotates and throws feed, additional feed falls through the barrel 16 lower opening 32 onto the spinner plate 34. The feed continues to fall from the barrel 16 until such time as the spinner plate 34 ceases to rotate or the feed supply contained within the barrel 16 is exhausted.

The feed thrown by the spinner plate 34 is deflected by the inside bin 18 side wall and falls downward into the hopper 44 and then into the conduit 20. The feed falls through the conduit 20 and exits the conduit 20 through the conduit 20 lower opening. The feed exiting the conduit 20 is radially deflected by the trough 24 central portion 52, comes to rest in the trough 24, and is available to be consumed by the animal. In the event of inclement weather, the feed resting in the trough 24 is protected from moisture by the rain shield 22. In the event all of the feed is not consumed between feedings, and the trough 24 becomes filled, the feed will cease flowing from the conduit 20 lower opening. Instead, the feed begins to stack up within the conduit 20 until such time as feed is removed from the trough 24.

When installing the collector 17 onto the feeder 14, the length of the conduit 20 is adjusted so that the trough 24 bears on the ground. This is particularly useful when the feeder is set up on uneven or sloped ground.

The conduit 20 is sized in diameter so as to hold a sufficient quantity of feed. The bin could be sized and shaped so as to incorporate the conduit. In this case, the bin would be around the dispenser and the conduit would be to the trough.

The collector 17 can easily be removed from the feeder to allow the distributor 28 to dispense the feed on the ground. The collector 17 can be reinstalled on the feeder 14 as often as needed or desired. For example, if a land owner wants to feed corn to wildlife, such as deer, the feeder can be set up without the collector 17. Corn is provided into the feeder, the dispenser timer is set, and allowed to operate. Over a period of time, the dispenser will dispense the corn onto the ground below and around the feeder. If the land owner wants to change feed, such as from corn to pellets, or if the conditions change, such as from dry to wet, the land owner can retrofit the feeder with the collector 17. This is done by simply attaching the collector to the feeder as described above. The feeder need not be emptied of any feed in the barrel. The collector 17 is suspended from the bottom of the barrel. No additional support is required. The length of the conduit 20 is adjusted so that the trough is in contact with the ground. The dispenser is then allowed to operate to dispense feed. If the weather conditions change, or the feed is changed, then the feeder 14 can be reconfigured to operate without the collector 17, wherein the collector is simply removed from the feeder. Thus, the owner can vary the distribution in dispensing a feed in accordance with the particular feed and weather conditions.

Conventional spinning feeders or distributors throw corn on the ground in a circle around the feeder. Because deer do not eat pellets off of the ground very well, feeding pellets with a conventional feeder on the ground produces waste. Conventional feeders that feed pellets disburse the pellets in a trough on an unregulated basis. This allows deer to feed at will; the deer with quickly empty the feeder at great expense. Further, deer feed during the day, while non-target animals feed at night. By regulating the amount and time of feeding with the present invention, the feed will be eaten by deer and not by non-target animals. In addition, deer can be fed on a regulated basis. Because small quantities of feed are dispensed, deer eat all of the feed, resulting in less waste due to damage from moisture.

The collector 17 can fit onto any 55 gallon barrel.

In addition, the transparent hatch 46 permits easy viewing and access to the dispenser 28 without the need to remove the collector from the feeder. If the dispenser is solar powered, then the transparent door 46 allows sunlight to illuminate the solar panel.

The foregoing disclosure and showings made in the drawings are merely illustrative of the principles of this invention and are not to be interpreted in a limiting sense. The scope of the invention is to be determined from the claims.

I claim:

1. An animal feeder comprising:
   a container having an interior that is structured and arranged to receive animal feed, the container being elevated above ground;
   a feed distributor adjacent to an exterior of the container and communicating with the container interior, the distributor structured and arranged to disperse feed from the container exterior of the container;
   a collector removably coupled to the container, the collector comprising a bin, wherein said bin at least partially surrounds the distributor so as to collect the food dispersed by the distributor, a conduit depending from the bin, the conduit having a lower end, and a trough on the conduit lower end, wherein the bin is comprised of a wall, said wall being comprised of an access hatch;
   the conduit has an adjustable length between the bin and the trough.

2. The animal feeder of claim 1, wherein the conduit is telescoping.

3. The animal feeder of claim 1 wherein the hatch is transparent.

4. The animal feeder of claim 1, the container having legs.

5. The animal feeder of claim 4, wherein the conduit is telescoping.

6. The animal feeder of claim 4, wherein said length may be adjusted so that the trough rests on the ground.

7. An animal feeder comprising:
   a container having an interior that is structured and arranged to receive animal feed, the container being elevated above ground;
   a feed distributor adjacent to an exterior of the container and communicating with the container interior, the distributor structured and arranged to disperse feed from the container exterior of the container;
   a collector removably coupled to the container, the collector comprising a bin, wherein said bin at least partially surrounds the distributor so as to collect the food dispersed by the distributor, a conduit depending from the bin, the conduit having a lower end, and a trough on the conduit lower end, wherein the bin is comprised of a wall, said wall being comprised of an access hatch; and
   a canopy located adjacent to the lower end of the conduit above, but not contacting, the trough, said canopy, trough and conduit defining an area, wherein said canopy is structured and arranged such that the area is unobstructed.

8. The animal feeder of claim 7, the canopy and trough each having a diameter, wherein the diameter of said canopy is greater than the diameter of said trough.

9. An animal feeder comprising:
   a container having an interior that is structured and arranged to receive animal feed, the container being elevated above ground;
   a feed distributor adjacent to an exterior of the container and communicating with the container interior, the distributor structured and arranged to disperse feed from the container exterior of the container;
   a collector removably coupled to the container, the collector comprising a bin, wherein said bin at least partially surrounds the distributor so as to collect the food dispersed by the distributor, a conduit depending from the bin, the conduit having a lower end, and a trough on the conduit lower end, wherein the bin is comprised of a wall, said wall being comprised of an access hatch; and
   at least a portion of the bin is transparent, said transparent portion being structured and arranged such that a user can view the distributor through said portion.

* * * * *